(No Model.)

G. R. AYRES.
Fly Net for Horses.

No. 232,917.  Patented Oct. 5, 1880.

Witnesses:
James F. Tobin,
Harry Smith.

Inventor:
G. Ralston Ayres,
by his attorneys
Howson & Son

UNITED STATES PATENT OFFICE.

G. RALSTON AYRES, OF PHILADELPHIA, PENNSYLVANIA, ASSIGNOR TO WILLIAM AYRES, G. RALSTON AYRES, JOHN C. AYRES, W. MONTGOMERY AYRES, AND LEWIS H. AYRES, ALL OF SAME PLACE.

FLY-NET FOR HORSES.

SPECIFICATION forming part of Letters Patent No. 232,917, dated October 5, 1880, Application filed August 23, 1880. (No model.)

*To all whom it may concern:*

Be it known that I, G. RALSTON AYRES, a citizen of the United States, residing in Philadelphia, Pennsylvania, have invented an Improved Fly-Net for Horses, of which the following is a specification.

My invention consists of a fly-net in which a body of woven net-work having strengthening-bands formed on the edges is combined and incorporated with substantial cords or lashes extending beyond the edges of said net-work body, so that they will, when the net is applied to a horse, form pendent fly-frighteners, the object of my invention being to produce a most efficient fly-net at a cheap rate.

Figure 1:
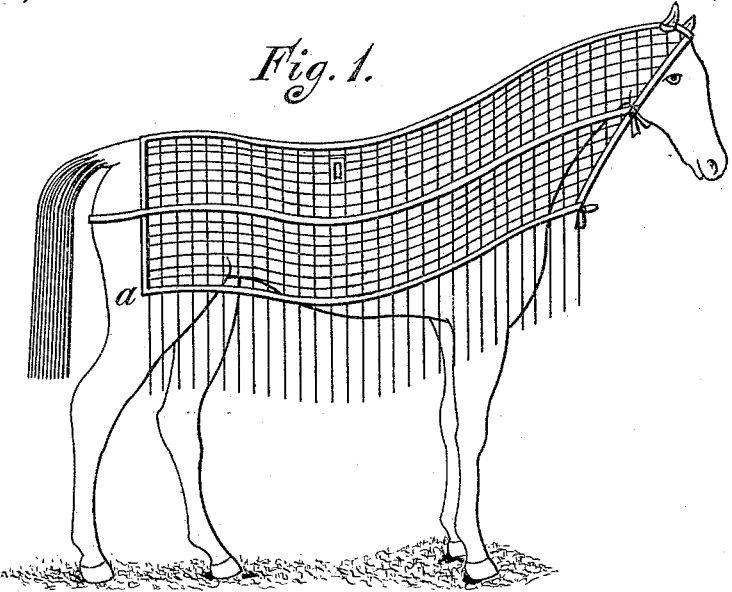
Figure 2:
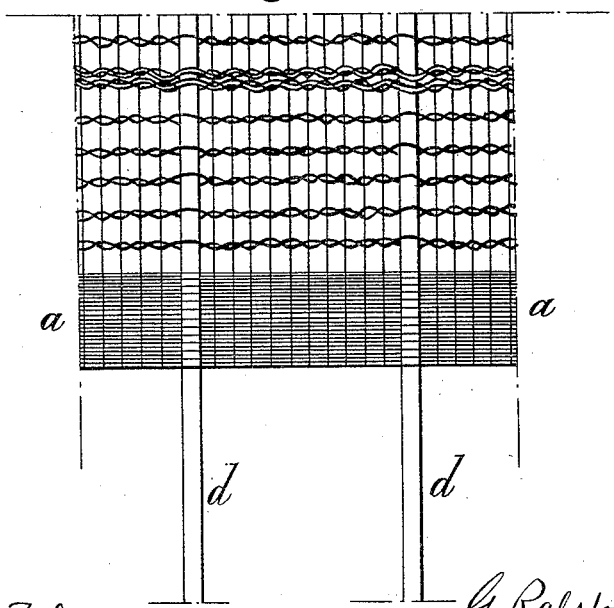

In the accompanying drawings, Figure 1 is a view of my improved horse-net as it usually appears when applied to a horse, and Fig. 2 a full-sized view of part of the net.

The main body of the net extends downward over the horse's body and flanks, and may or may not extend over its ears, and is of a general shape similar to that of ordinary horse-nets. The body consists of a woven net-work fabric, the edges $a$ of which are strengthened by keeping the warp-threads close to each other, and longitudinal strengthening-bands may also be formed in the same manner in the body of the net, at suitable intervals between the edges of the same. This, however, forms no part of the present invention, as it is described and claimed in the Letters Patent granted to me June 3, 1879.

Substantial cords or lashes $d$ are incorporated with the fabric forming the body of the net at intervals, as best observed in Fig. 2, and these cords, when the net is applied to the horse, extend downward below the edges $a\ a$ of the body of the net, so as to form pendent fly-frighteners.

The net-work of the body of the fabric between the cords or lashes $d\ d$ has meshes fine enough to prevent the flies from attacking the back and flanks of the horse, while the tremulous action of the pendent cords or lashes has the effect of keeping them away from other parts of the body.

An effective fly-net, in which the net proper and pendent cords or lashes are combined, can be produced at a cheap rate, for the cords or lashes are incorporated with the net-work during the operation of weaving the same.

The transverse cords or lashes also impart considerable additional strength to the net in a lateral direction.

I have shown in the drawings a peculiar character of net-work fabric forming the body of the net; but this is not essential to my invention, as various styles of net-work may be adopted which will permit the incorporation therewith of the transverse cords or lashes $d$.

I claim as my invention—

The within-described fly-net for horses, the same consisting of a body of woven net-work having strengthening-bands formed on the edges, in combination with cords or lashes incorporated in both net-work and bands at intervals, and extending beyond the said edges, all substantially as set forth.

In testimony whereof I have signed my name to this specification in the presence of two subscribing witnesses.

G. RALSTON AYRES.

Witnesses:
JAMES F. TOBIN,
HARRY SMITH.